US012645935B2

(12) United States Patent
Lee et al.

(10) Patent No.: US 12,645,935 B2
(45) Date of Patent: Jun. 2, 2026

(54) NEURAL NETWORK MODEL TRAINING METHOD AND APPARATUS

(71) Applicant: RESEARCH & BUSINESS FOUNDATION SUNGKYUNKWAN UNIVERSITY, Suwon-si (KR)

(72) Inventors: Jee Hyong Lee, Suwon-si (KR); Jin Sub Lee, Suwon-si (KR); Dong Eon Jeong, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 1017 days.

(21) Appl. No.: 17/552,974

(22) Filed: Dec. 16, 2021

(65) Prior Publication Data

US 2022/0198270 A1      Jun. 23, 2022

(30) Foreign Application Priority Data

Dec. 22, 2020    (KR) ........................ 10-2020-0180495

(51) Int. Cl.
*G06N 3/08*          (2023.01)
*G06N 3/048*         (2023.01)

(52) U.S. Cl.
CPC .............. *G06N 3/08* (2013.01); *G06N 3/048* (2023.01)

(58) Field of Classification Search
CPC .......... G06N 3/08; G06N 3/048; G06N 3/045; G06N 3/084; G06N 3/088; G06N 3/0475; G06N 3/063
See application file for complete search history.

(56) References Cited

U.S. PATENT DOCUMENTS

| | | | |
|---|---|---|---|
| 11,468,314 B1* | 10/2022 | Singh ...................... | G06F 18/24 |
| 2019/0164055 A1* | 5/2019 | Ljung Larhed .......... | G06N 3/08 |
| 2020/0151448 A1* | 5/2020 | Lin ........................... | G06N 3/08 |
| 2020/0285952 A1* | 9/2020 | Liu .......................... | G06N 3/08 |
| 2022/0036059 A1* | 2/2022 | He .......................... | G06V 10/26 |

FOREIGN PATENT DOCUMENTS

KR    10-2017-0095582 A     8/2017

OTHER PUBLICATIONS

Li et al., "Towards Adversarial Robustness via Feature Matching", Apr. 2020 (Year: 2020).*
Zhou et al., "Learning Deep Features for Discriminative Localization", Dec. 2015 (Year: 2015).*

* cited by examiner

*Primary Examiner* — Reji Kartholy
(74) *Attorney, Agent, or Firm* — NSIP Law

(57)                ABSTRACT

A neural network model training method and apparatus are provided. The method includes a first training operation of training the neural network model with original data, the first training operation including generating a first feature map for the original data, and generating a first class activation map for the original data from the generated first feature map, and a second training operation of training the neural network model with adversarial data transformed from the original data, the second training operation including generating a second feature map for the adversarial data, generating a second class activation map for the adversarial data from the generated second feature map, and training the neural network model so that the second class activation map follows the first class activation map based on logit pairing for the first and second class activation maps.

12 Claims, 4 Drawing Sheets

FIG. 2

S100 FIRST TRAINING OPERATION THROUGH ORIGINAL DATA

- GENERATE FIRST FEATURE MAP — S110
- GENERATE FIRST CLASS ACTIVATION — S120

S200 SECOND TRAINING OPERATION THROUGH ADVERSARIAL DATA

- GENERATE SECOND FEATURE MAP — S210
- GENERATE SECOND CLASS ACTIVATION MAP — S220
- TRAIN NEURAL NETWORK MODEL SO THAT SECOND ACTIVATION MAP FOLLOWS FIRST CLASS ACTIVATION MAP — S230

FIG. 4

| | FIRST CLASS ACTIVATION MAP FOR ORIGINAL DATA | SECOND CLASS ACTIVATION MAP FOR ADVERSARIAL DATA | | FIRST CLASS ACTIVATION MAP FOR ORIGINAL DATA | SECOND CLASS ACTIVATION MAP FOR ADVERSARIAL DATA |
|---|---|---|---|---|---|
| [0] Air plane | | | [5] Dog | | |
| [1] Auto mobile | | | [6] Frog | | |
| [2] Bird | | | [7] Horse | | |
| [3] Cat | | | [8] Ship | | |
| [4] Deer | | | [9] Truck | | |

NEURAL NETWORK MODEL TRAINING METHOD AND APPARATUS

CROSS-REFERENCE TO RELATED APPLICATION(S)

This application claims the benefit under 35 USC § 119(a) of Korean Patent Application No. 10-2020-0180495, filed on Dec. 22, 2020, in the Korean Intellectual Property Office, the entire disclosure of which is incorporated herein by reference for all purposes.

BACKGROUND

1. Field

The following description relates to a neural network model training method and apparatus.

2. Description of Related Art

Deep learning refers to artificial intelligence (AI) technology that enables machines to think and train similar to humans, and enables machines to learn and solve complex nonlinear problems by themselves based on artificial neural network theory. When such deep learning technology is applied, the computer may perform operations such as, but not limited to, recognition, reasoning, and judgment on its own without a person setting all judgment criteria and, thus, is widely applied in the field of pattern analysis.

An artificial neural network (ANN) has a structure in which a plurality of hidden layers are arranged between an input layer and an output layer and repeatedly performs linear fitting, nonlinear transformation (nonlinear activation), or the like.

Since the artificial neural network is being applied to a wide range of fields such as image recognition, speech recognition, an intrusion tolerance system, and natural language processing, security problems have been raised. Specifically, even when the human eye may not recognize micro-modulation caused to input data, the micro-modulated input data may cause the artificial neural network to erroneously identify a class of the input data. For example, in autonomous vehicle that drive by recognizing road signs through the artificial neural network, there is a problem in that an unintended operation of the autonomous vehicle is induced by micro-modulating a road sign image input to the artificial neural network (e.g., when the micro-modulation of a left-turn indicator image causes the autonomous vehicle to turn right). The above-described micro-modulated input data is called an adversarial example, and the input data recognized as a class different from the class of the original image through minimal image modulation is called adversarial attack or evasion attack.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a processor-implemented neural network model training method includes a first training operation of training the neural network model with original data, the first training operation including generating a first feature map for the original data, and generating a first class activation map for the original data from the generated first feature map; and a second training operation of training the neural network model with adversarial data transformed from the original data, the second training operation including generating a second feature map for the adversarial data, generating a second class activation map for the adversarial data from the generated second feature map, and training the neural network model so that the second class activation map follows the first class activation map based on logit pairing for the first class activation map and the second class activation map.

The adversarial data may be acquired by applying a projected gradient descent (PGD) algorithm to the original data.

In the second training operation of the training of the neural network model, the neural network model may be trained so that the second class activation map follows the first class activation map to identify a class of the adversarial data as a class of the original data.

In the second training operation of the training of the neural network model, a loss function indicating a loss of the second class activation map with respect to the first class activation map may be defined based on the logit pairing, and the neural network model is trained so that an output value of the loss function is minimized.

The loss function may indicate a difference between an activation value of the first class activation map and an activation value of the second class activation map.

In a general aspect, a neural network model training apparatus includes one or more processors, configured to: generate a first feature map for original data by training the neural network model with the original data, generate a first class activation map for the original data from the generated first feature map, generate a second feature map for adversarial data by training the neural network model through the adversarial data transformed from the original data, generate a second class activation map for the adversarial data from the generated second feature map, and train the neural network model so that the second class activation map follows the first class activation map based on logit pairing for the first class activation map and the second class activation map.

The one or more processors may be configured to train the neural network model so that the second class activation map follows the first class activation map to identify a class of the adversarial data as a class of the original data.

The one or more processors may be configured to define a loss function indicating a loss of the second class activation map with respect to the first class activation map based on the logit pairing, and train the neural network model so that an output value of the loss function is minimized.

The loss function may indicate a difference between an activation value of the first class activation map and an activation value of the second class activation map.

The apparatus may further include a memory storing instructions that, when executed by the one or more processors, configure the one or more processors to perform the generating of the first feature map, the generating of the first class activation map, the generating of the second feature map, the generating of the second class activation map, and the training of the neural network model.

The apparatus may be any one of a personal computer (PC), a personal digital assistants (PDA), a server device, a mobile device, a smart phone, an autonomous vehicle, a robotics device, a tablet device, an augmented reality (AR) device, and an internet-of-things (IoT) device.

The apparatus may further include implementing the trained neural network for captured original data.

In one or more aspects, a non-transitory computer-readable storage medium storing instructions that, when executed by a processor, cause the processor to: perform a first training operation of training a neural network model with original data, the first training operation including: generating a first feature map for the original data, and generating a first class activation map for the original data from the generated first feature map; and perform a second training operation of training the neural network model with adversarial data transformed from the original data, the second training operation including: generating a second feature map for the adversarial data, generating a second class activation map for the adversarial data from the generated second feature map, and training the neural network model so that the second class activation map follows the first class activation map based on logit pairing for the first class activation map and the second class activation map.

Other features and aspects will be apparent from the following detailed description, the drawings, and the claims.

BRIEF DESCRIPTION OF DRAWINGS

FIG. 2 illustrates a diagram of an example process of training a neural network model through a method of training a neural network model, in accordance with one or more embodiments.

FIG. 4 illustrates a diagram of examples of first and second class activation maps derived from the process of training a neural network model through the method of training a neural network model, in accordance with one or more embodiments.

Figure 1:
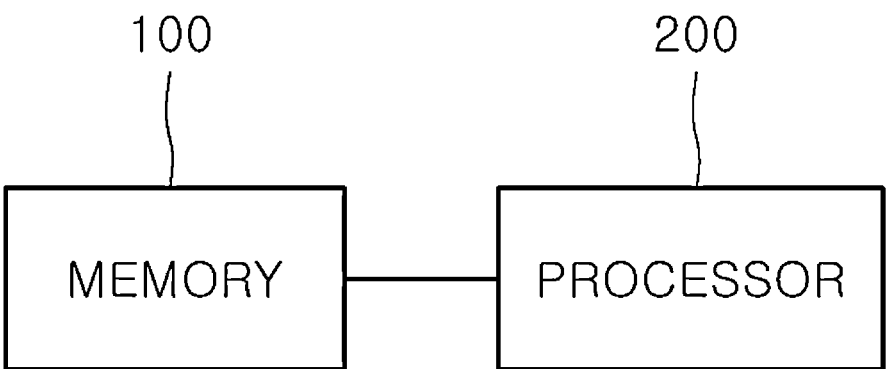
FIG. 1 illustrates a block configuration diagram of an example neural network model training apparatus, in accordance with one or more embodiments.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness, noting that omissions of features and their descriptions are also not intended to be admissions of their general knowledge.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains and after an understanding of the disclosure of this application. Terms, such as those defined in commonly used dictionaries, are to be interpreted as having a meaning that is consistent with their meaning in the context of the relevant art and the disclosure of this application, and are not to be interpreted in an idealized or overly formal sense unless expressly so defined herein.

Hereinafter, examples will be described in detail with reference to the accompanying drawings. When describing the examples with reference to the accompanying drawings, like reference numerals refer to like components and a repeated description related thereto will be omitted.

In an example, the example neural network training method and apparatus may train a neural network model to be robust against an adversarial attack. Herein, it is noted that use of the term 'may' with respect to an example or embodiment, e.g., as to what an example or embodiment may include or implement, means that at least one example or embodiment exists where such a feature is included or implemented while all examples and embodiments are not limited thereto.

Figure 2:
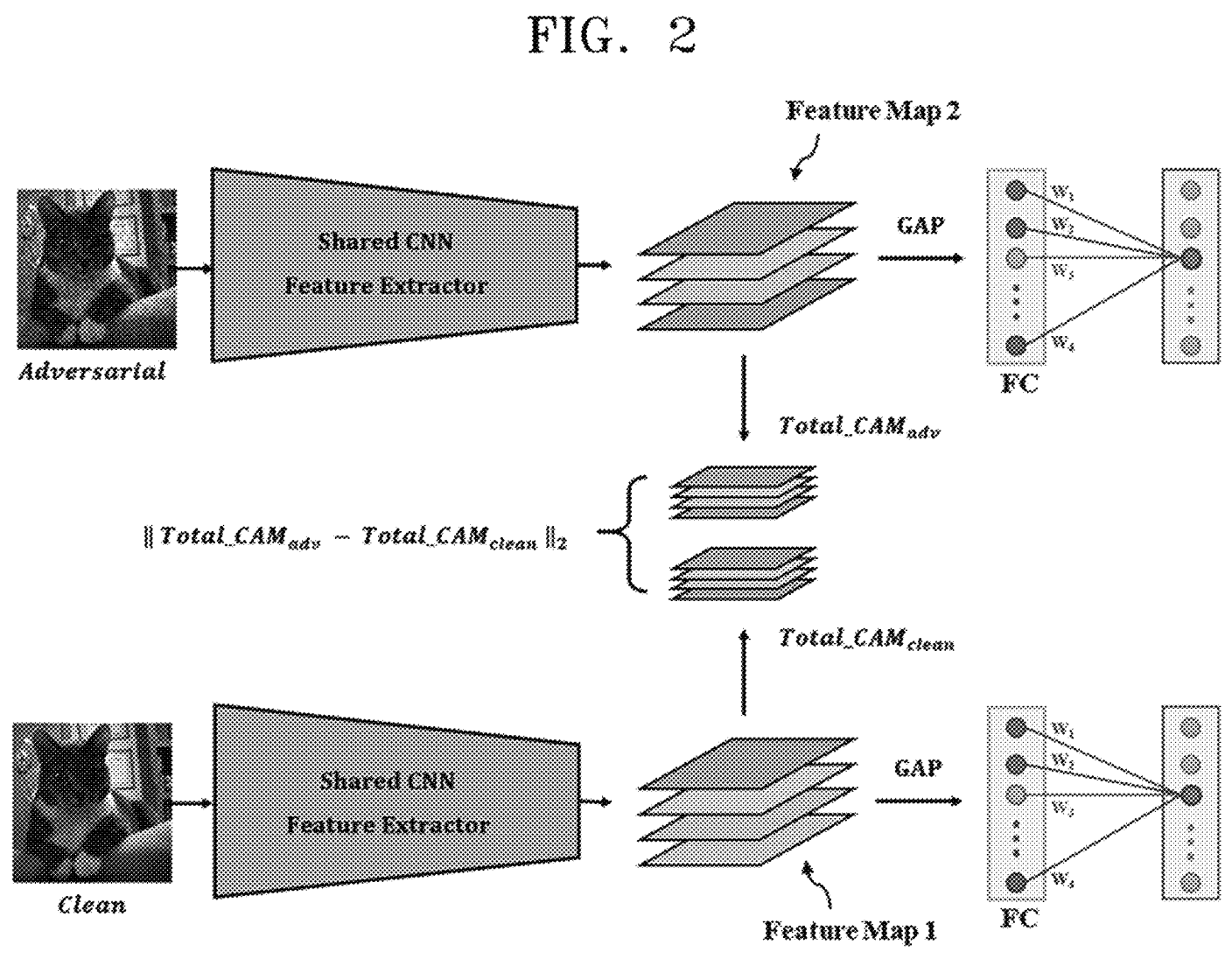
Figure 3:
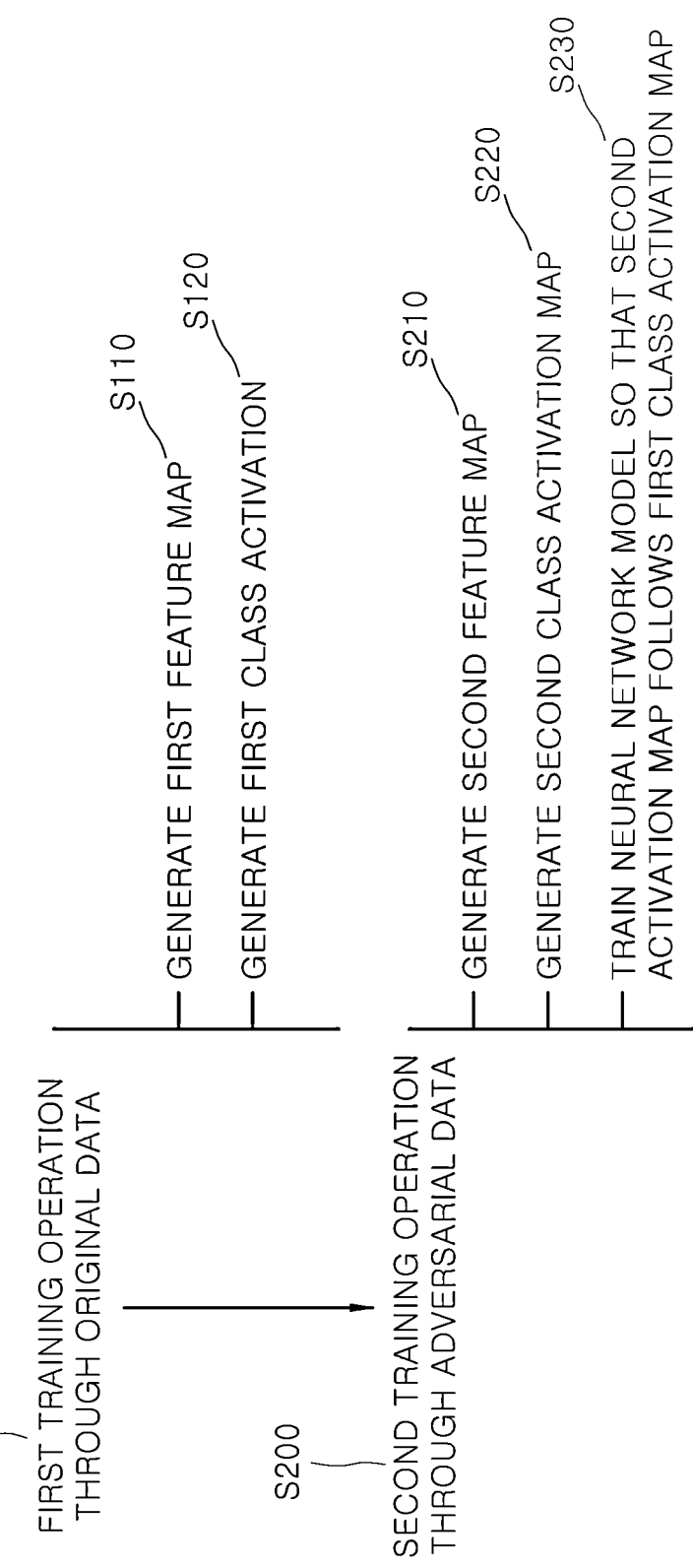
FIG. 3 is a flowchart illustrating a method of training a neural network model, in accordance with one or more embodiments.

FIG. 1 is a block configuration diagram illustrating an example neural network model training apparatus, in accordance with one or more embodiments. FIG. 2 illustrates an example process of training a neural network model through a method of training a neural network model, in accordance with one or more embodiments. FIG. 3 is a flowchart illustrating a method of training a neural network model, in accordance with one or more embodiments. FIG. 4 illustrates examples of first and second class activation maps derived from an example process of training a neural network model through a method of training a neural network model, in accordance with one or more embodiments.

A neural network model to be trained in the one or more examples is an artificial neural network model configured to identify a class of input data, and in the examples, an example of a convolutional neural network (CNN) model as illustrated in FIG. 2 will be described.

In training the neural network model as described above, the example neural network model training apparatus may include a memory 100 and a processor 200 as illustrated in FIG. 1. The apparatus may include, for example, a laptop computer, a mobile phone, a smartphone, a tablet personal computer (PC), a mobile Internet device (MID), a personal digital assistant (PDA), an enterprise digital assistant (EDA), a digital still camera, a digital video camera, a portable multimedia player (PMP), a personal or portable navigation device (PND), a handheld game console, an e-book, a smart device, and the like. The smart device may include, for example, a smart watch and a smart band.

The memory 100 may include at least one of volatile memory or nonvolatile memory. The nonvolatile memory may include read only memory (ROM), programmable ROM (PROM), electrically programmable ROM (EPROM), electrically erasable and programmable ROM (EEPROM), flash memory, phase-change RAM (PRAM), magnetic RAM (MRAM), resistive RAM (RRAM), ferroelectric RAM (FRAM), and the like. The volatile memory may include dynamic RAM (DRAM), static RAM (SRAM), synchronous DRAM (SDRAM), phase-change RAM (PRAM), magnetic RAM (MRAM), resistive RAM (RRAM), ferroelectric RAM (FeRAM), and the like. Furthermore, the memory 120 may include at least one of hard disk drives (HDDs), solid state drive (SSDs), compact flash (CF) cards, secure digital (SD) cards, micro secure digital (Micro-SD) cards, mini secure digital (Mini-SD) cards, extreme digital (xD) cards, or Memory Sticks.

The processor 200 is a hardware configuration for performing general control functions to control operations of the neural network apparatus. For example, the processor 200 may generally control the neural network apparatus by executing instructions stored in the memory 100 of the neural network apparatus 100. The processor 200 may be implemented by, as non-limiting examples, a central processing unit (CPU), a graphics processing unit (GPU), an application processor (AP), a neural processing unit (NPU), and the like, which may be provided in the neural network g apparatus.

At least one command to train a neural network model may be stored in the memory 100. The memory 100 may be implemented as a volatile storage medium and/or a nonvolatile storage medium and may be implemented as, for example, a read only memory (ROM) and/or a random access memory (RAM).

The processor 200 is a training subject that performs training on the neural network model, and may be implemented as a central processing unit (CPU) or a system on chip (SoC), and may operate an operating system or applications to control a plurality of hardware or software components connected to the processor 200, thereby performing various data processing and operations. The processor 200 may be configured to execute at least one command stored in the memory 100 and store the execution result data in the memory 100.

In an example, the neural network apparatus may further store instructions, e.g., in memory 100, which when executed by the processor 200 configure the processor 200 to implement one or more or any combination of operations herein. The processor 200 and the memory 100 may be respectively representative of one or more processors 200 and one or more memories 100.

At least one command stored in the memory 100 and executed by the processor 200 includes: i) a command to generate a first feature map for original data by training the neural network model through the original data; ii) a command to generate a first class activation map for the original data from the first feature map, iii) a command to generate a second feature map for adversarial data by training the neural network model through the adversarial data transformed from the original data, iv) a command to generate a second class activation map for the adversarial data from the second feature map, and v) a command to train the neural network model so that the second class activation map follows the first class activation map based on logit pairing for the first and second class activation maps.

FIG. 2 illustrates an example process of performing a method of training a neural network model, in accordance with one or more embodiments.

As illustrated in FIG. 2, the example method of training a neural network model may largely include a training process using original data, and a training process using adversarial data (adversarial example) transformed from the original data. The original data and the adversarial data may correspond to image data, and the adversarial data may be obtained by applying a projected gradient descent (PGD) algorithm to the original data. The training of a neural network may mean determining and updating weights and biases between layers or between a plurality of nodes that belong to different layers of adjacent layers.

In an example, to schematically describe the method of training a neural network model, the processor 200 may train the neural network model in a manner of updating parameters (filter parameter, weight vector, or the like) of the neural network model in the process of repeatedly performing an operation of executing instructions stored in the memory 100, and thus, as illustrated in FIG. 2, inputting input data to the neural network model along with the class to extract a feature map for each channel of the input data, applying global average pooling (GAP) to the extracted feature map for each channel, and then applying a weighted sum result value between an application result value of the GAP and a fully-connected (FC) layer to a classifier (for example, SoftMax) to predict the class of the input data.

In an example, in order to ensure robustness of the neural network model against adversarial attack, it may be beneficial to train the neural network model to ensure interpretive agreement between the original data and the adversarial data. That is, even when an adversarial attack through adversarial data is applied to the neural network model, it may be beneficial to train the neural network model to be identified as the same class as the original data. In the example, to train the neural network model to ensure the interpretative agreement between the original data and the adversarial data, a logit pairing method for each class activation map of the original data and the adversarial data may be adopted, and the configuration will be described in detail below as the method of training a neural network model.

Referring to FIG. 3, first, the processor 200 may perform a first training operation (operation S100) of training the neural network model using the original data.

In operation S100, the processor 200 generates a first feature map for each channel for the original data through a feature extractor of the neural network model (operation S110). Subsequently, the process of training the neural network model may be performed by repeatedly performing the operation of applying the GAP to the first feature map for each channel, and then applying the weighted sum between the GAP application result value and the weight vector of the fully-connected layer to the classifier to repeatedly perform the class of the original data.

Additionally, the processor 200 may generate a first class activation map for the original data from the first feature map for each channel generated in operation S110 (operation S120). In operation S120, the processor 200 multiplies the first feature map and the weight vector of the fully-connected layer for each channel, and then sums the results to generate the first class activation map. The first class activation map may be expressed by Equation 1 below.

$$CAM^c_{clean} = \sum_k \alpha^c_k A^k \qquad \text{Equation 1}$$

In Equation 1, c denotes a target class, k denotes a channel index, $CAM^c_{clean}$ denotes a first class activation map for target class c, and $\alpha_k^c$ denotes a weight vector of a fully-connected for the target class c, and $A^k$ denotes a first feature map for the channel k.

In an example, an activation value ($CAM^c_{clean}$/act) of the first class activation map is defined as in Equation 2 below by applying an activation function "ReLU".

$$CAM^c_{clean/act} = ReLU\left(\sum_k \alpha^c_k A^k\right) \qquad \text{Equation 2}$$

When the number of classes to be classified through the neural network model is defined as n, the operations S110 and S120 may be performed n times with the target class c from 0 to n−1, and thus, n activation values of the first class activation map are also calculated. When a set of n calculated activation values is defined as a "first activation value ($TotalCAM_{clean}$)", the first activation value ($TotalCAM_{clean}$) may be expressed by Equation 3 below.

$$TotalCAM_{clean} = (CAM^0_{clean/act}, CAM^1_{clean/act}, \cdots \\ CAM^{n-1}_{clean/act}) \qquad \text{Equation 3:}$$

The first activation value $TotalCAM_{clean}$ obtained through the first learning operation S100 becomes input data in the second learning operation S200 to be described below.

After operation S100, the processor 200 performs a second training operation S200 of training the neural network model using the adversarial data, and operation S200 may be an adversarial training process.

In operation S200, the processor 200 generates a second feature map for the adversarial data through a feature extractor of the neural network model (operation S210).

Next, the processor 200 generates a second class activation map for the adversarial data from the second feature map for each channel generated in operation S210 (S220). The operation method of operation S220 is the same as the operation method of operation S120, and accordingly, the second class activation map ($CAM^c_{adv}$) for the adversarial data calculated in operation S220, the activation value ($CAM^c_{adv/act}$) of the second class activation map, and the second activation values ($TotalCAM_{adv}$) may be respectively expressed by Equations 4 to 6 below.

$$CAM^c_{adv} = \sum_k \alpha^c_k A^k \qquad \text{Equation 4}$$

$$CAM^c_{adv/act} = ReLU\left(\sum_k \alpha^c_k A^k\right) \qquad \text{Equation 5}$$

$$TotalCAM_{adv} = (CAM^0_{adv/act}, CAM^1_{adv/act}, \ldots CAM^{n-1}_{adv/act}) \qquad \text{Equation 6}$$

FIG. 4 illustrates examples of the first and second class activation maps derived in the one or more examples, and the number n of classes is 10, and the first and second class activation maps for each class are derived.

After operation S220, the processor 200 trains the neural network model so that the second class activation map follows the first class activation map based on the logit pairing for the first and second class activation maps, and accordingly, the class of the adversarial data A is identified as the class of the original data (S230).

Specifically, in operation S230, the processor 200 defines a loss function indicating the loss of the second class activation map with respect to the first class activation map based on the logit pairing, and trains the neural network model so that an output value of the loss function is minimized. In an example, the loss function indicates a difference between the activation value of the first class activation map and the activation value of the second class activation map, and the loss function may be specified as indicating the difference between the above-described first activation value ($TotalCAM_{clean}$) and the second activation value clean, ($TotalCAM_{adv}$) in consideration that the number of classes to be classified is n. As the "difference", the one or more examples may implement a mean square error (MSE), and thus, the loss function may be defined by Equation 7 below.

$$Loss_{CAMpairing} = \|TotalCAM_{clean/act} - \\ TotalCAM_{adv/act}\|_2 \qquad \text{Equation 7:}$$

Additionally, in addition to the loss between the class activation maps of the original data and the adversarial data, a basic cross-entropy loss function (LossCrossEntropy) may be reflected in the above-described loss function to secure the classification performance of the original data (since the cross-entropy loss function is well known in the art, a detailed description thereof will be omitted). Accordingly, a final loss function (Loss) may be defined by the following Equation 8.

$$Loss = Loss_{CrossEntropy} + Loss_{CAMpairing} \qquad \text{Equation 8:}$$

Accordingly, in operation S230, the processor 200 trains the neural network model to identify the class of the adversarial data as the class of the original data by performing adversarial training on the neural network model so that the output value of the loss function according to Equation 8 is minimized, thereby training the neural network model to be robust against the adversarial attack.

The memory 100, processor 200, and other apparatuses, units, modules, devices, and other components described herein, are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods that perform the operations described in this application and illustrated in FIGS. 1-4 are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller, e.g., as respective operations of processor implemented methods. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computers using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EE-PROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

Although discussed only in the context of a single form of implementation (e.g., discussed only as a method), implementations of the discussed features may also be implemented in other forms (for example, an apparatus or a program). The apparatus may be implemented in suitable hardware, software, and firmware, and the like. A method may be implemented in an apparatus such as a processor, which generally refers to a computer, a microprocessor, an integrated circuit, a processing device including a programmable logic device, or the like. The processor also includes communication devices such as, but not limited to, a computer, a cell phone, portable/personal digital assistants (PDA), a server device, a mobile device, a smart phone, an autonomous vehicle, a robotics device, a tablet device, an augmented reality (AR) device, an Internet of Things (IoT) device, and other devices that facilitate communication of information between end-users.

According to one aspect of the examples, an artificial neural network model may be trained in such a manner that a loss between a first class activation map for original data and a second class activation map for adversarial data may be minimized to ensure interpretive agreement between original data and adversarial data, thereby training an artificial neural network to be robust against an adversarial attack.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented neural network model training method against adversarial attack, the method comprising:

performing a first training operation of training the neural network model with original data, the first training operation comprising:

generating a first feature map for the original data, and generating a first class activation map for the original data from the generated first feature map; and performing a second training operation of training the neural network model with adversarial data transformed from the original data such that the neural network model identifies a class of the adversarial data same as a class of the original data, wherein training the neural network model comprises determining and updating weights and biases between layers or a plurality of nodes that belong to different layers of adjacent layers, the second training operation comprising:

generating a second feature map for the adversarial data, generating a second class activation map for the adversarial data from the generated second feature map, and training the neural network model so that the second class activation map from the generated second feature map follows the first class activation map from the generated first feature map based on logit pairing for the first class activation map and the second class activation map, wherein the first training operation generates a first set of activation values from the first class activation map, and wherein training the neural network model in the second training operation comprises using the first set of activation values as a target for aligning a second set of activation values generated from the second class activation map such that a difference between the first set of activation values and the second set of activation values is minimized.

2. The method of claim 1, wherein the adversarial data is acquired by applying a projected gradient descent (PGD) algorithm to the original data.

3. The method of claim 1, wherein, in the second training operation of the training of the neural network model, a loss function indicating a loss of the second class activation map with respect to the first class activation map is defined based on the logit pairing, and the neural network model is trained so that an output value of the loss function is minimized.

4. The method of claim 3, wherein the loss function indicates a difference between an activation value of the first class activation map and an activation value of the second class activation map.

5. The method of claim 3, wherein the loss function is a combined loss function (Loss) that includes a first component representing the loss of the second class activation map with respect to the first class activation map, and a second component representing a cross-entropy loss for classification of the original data.

6. A neural network model training apparatus against adversarial attack, comprising:

one or more processors, configured to:

performing a first training operation by training the neural network model with original data, the first training operation comprising:

generating a first feature map for the original data, and generating a first class activation map for the original data from the generated first feature map, performing a second training operation by training the neural network model with adversarial data transformed from the original data such that the neural network model identifies a class of the adversarial data same as a class of the original data, wherein the training the neural network model comprises determining and updating weights and biases between layers or a plurality of nodes that belong to different layers of adjacent layers, the second training operation comprising:

generating a second feature map for the adversarial data, generating a second class activation map for the adversarial data from the generated second feature map, and training the neural network model so that the second class activation map from the generated second feature map follows the first class activation map from the generated first feature map based on logit pairing for the first class activation map and the second class activation map, wherein the first training operation generates a first set of activation values from the first class activation map, and wherein training the neural network model in the second training operation comprises using the first set of activation values as a target for aligning a second set of activation values generated from the second class activation map such that a difference between the first set of activation values and the second set of activation values is minimized.

7. The apparatus of claim 6, wherein, the one or more processors are configured to define a loss function indicating a loss of the second class activation map with respect to the first class activation map based on the logit pairing, and train the neural network model so that an output value of the loss function is minimized.

8. The apparatus of claim 7, wherein the loss function indicates a difference between an activation value of the first class activation map and an activation value of the second class activation map.

9. The apparatus of claim 6, further comprising a memory storing instructions that, when executed by the one or more processors, configure the one or more processors to perform the generating of the first feature map, the generating of the first class activation map, the generating of the second feature map, the generating of the second class activation map, and the training of the neural network model.

10. The apparatus of claim 6, wherein the apparatus is any one of a personal computer (PC), a personal digital assistant (PDA), a server device, a mobile device, a smart phone, an autonomous vehicle, a robotics device, a tablet device, an augmented reality (AR) device, and an internet-of-things (IoT) device.

11. The apparatus of claim 6, further comprising implementing the trained neural network for captured original data.

12. A non-transitory computer-readable storage medium storing instructions that, when executed by a processor, cause the processor to:

perform a first training operation of training a neural network model with original data, the first training operation comprising:

generating a first feature map for the original data, and generating a first class activation map for the original data from the generated first feature map; and perform a second training operation of training the neural network model with adversarial data transformed from the original data such that the neural network model identifies a class of the adversarial data same as a class of the original data, wherein training the neural network model comprises determining and updating weights and biases between layers or a plurality of nodes that belong to different layers of adjacent layers, the second training operation comprising:

generating a second feature map for the adversarial data, generating a second class activation map for the adversarial data from the generated second feature map, and training the neural network model so that the second class activation map from the generated second feature map follows the first class activation map from the generated first feature map based on logit pairing for the first class activation map and the second class activation map, wherein the first training operation generates a first set of activation values from the first class activation map, and wherein training the neural network model in the second training operation comprises using the first set of activation values as a target for aligning a second set of activation values generated from the second class activation map such that a difference between the first set of activation values and the second set of activation values is minimized.

* * * * *